(12) United States Patent
Zhou

(10) Patent No.: US 12,360,647 B2
(45) Date of Patent: Jul. 15, 2025

(54) INTERACTION METHOD AND APPARATUS, AND STORAGE MEDIUM

(71) Applicant: Beijing Zitiao Network Technology Co., Ltd., Beijing (CN)

(72) Inventor: Chao Zhou, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/998,718

(22) PCT Filed: Sep. 30, 2022

(86) PCT No.: PCT/CN2022/123489
§ 371 (c)(1),
(2) Date: Nov. 14, 2022

(87) PCT Pub. No.: WO2023/173726
PCT Pub. Date: Sep. 21, 2023

(65) Prior Publication Data
US 2024/0176456 A1    May 30, 2024

(30) Foreign Application Priority Data
Mar. 16, 2022   (CN) .......................... 202210260731.4

(51) Int. Cl.
*G06T 19/00* (2011.01)
*G06F 3/0481* (2022.01)
*G06F 9/451* (2018.01)

(52) U.S. Cl.
CPC ............ *G06F 3/0481* (2013.01); *G06F 9/451* (2018.02)

(58) Field of Classification Search
CPC ......... G06F 3/048; G06F 3/0481; G06F 9/451
See application file for complete search history.

(56) References Cited

U.S. PATENT DOCUMENTS

2017/0038830 A1\* 2/2017 Clement ............. G06F 3/04847
2017/0212583 A1   7/2017 Krasadakis
(Continued)

FOREIGN PATENT DOCUMENTS

CN    107145227 A    9/2017
CN    109782920 A    5/2019
(Continued)

OTHER PUBLICATIONS

European Patent Office, Extended European Search Report Issued in Application No. 22799838.2, Nov. 3, 2023, Germany, 9 pages.
(Continued)

*Primary Examiner* — Mahelet Shiberou
(74) *Attorney, Agent, or Firm* — Alleman Hall & Tuttle LLP

(57) ABSTRACT

The present disclosure provides an interaction method and apparatus, and a storage medium. The method includes: an execution component receives a trigger request sent by an input device, where the execution component corresponds to the input device. A state of the execution component is active, and states of other execution components are inactive. Thus, only one input device is active (can trigger an event) at the same time, so that an UI only responds to one trigger at the same time. And then, according to the trigger request, trigger signal collision detection and event processing are performed, and a processed result is displayed on the UI. It solves the problem that how the UI responds correctly for the interaction between multiple input devices and the UI in a XR scenario, and ensures the UI interaction in the XR scenario is correct, fast and complete.

20 Claims, 6 Drawing Sheets

(56) References Cited

U.S. PATENT DOCUMENTS

| | | | |
|---|---|---|---|
| 2018/0193742 A1* | 7/2018 | O'Connor | ............ H04L 69/329 |
| 2018/0359448 A1 | 12/2018 | Harries | |
| 2020/0043243 A1 | 2/2020 | Bhushan et al. | |

FOREIGN PATENT DOCUMENTS

| | | | |
|---|---|---|---|
| CN | 106178499 | B | 5/2020 |
| CN | 111459265 | A | 7/2020 |
| CN | 111586452 | A | 8/2020 |
| CN | 111656256 | A | 9/2020 |
| CN | 111803930 | A | 10/2020 |
| CN | 114625253 | A | 6/2022 |

OTHER PUBLICATIONS

ISA China National Intellectual Property Administration, International Search Report Issued in PCT Application No. PCT/CN2022/123489, Jan. 4, 2023, WIPO, 11 pages.
China National Intellectual Property Administration, Office Action Issued in Application No. 202210260731.4, Jun. 13, 2024, 12 pages.

* cited by examiner

INTERACTION METHOD AND APPARATUS, AND STORAGE MEDIUM

CROSS-REFERENCE TO RELATED APPLICATIONS

This application is a national stage of International Application No. PCT/CN2022/123489, filed on Sep. 30, 2022, which claims priority to Chinese patent application No. 202210260731.4, filed to the China National Intellectual Property Administration on Mar. 16, 2022 and entitled "Interaction Method and Apparatus, and Storage Medium". The disclosures of the aforementioned applications are hereby incorporated by reference in their entireties.

TECHNICAL FIELD

The present disclosure relates to virtual reality technology, and in particular, to an interaction method and apparatus, and a storage medium.

BACKGROUND

Virtual reality (VR) technology is a virtual environment created by modern computer technology. Users can use a specific human-computer interaction device and apparatus to interact with the virtual environment to generate an immersive experience. Extended reality (XR) is a further development of virtual reality technology. The extended reality refers to the creation of a real and virtual combined and human-computer interactive environment through computer technology and a wearable device.

Interaction with a virtual object is an essential part of a XR world. There are two interaction methods according to distance: one is near-field interaction, where the user touches an object through a finger click or with a handle or the like; and the other is far-field interaction, where the user generally uses ray to perform collision detection on the virtual object to further complete an entire trigger cycle.

For the far-field interaction, more than one input device may exist at the same time in an XR scenario, and a user interface (UI) in the scenario can only respond to one trigger at the same time. Therefore, how to manage interaction between multiple input devices and the UI in the XR scenario has become an urgent problem to be solved.

SUMMARY

The present disclosure provides an interaction method and apparatus, and a storage medium, to manage the interaction between multiple input devices and a UI in an XR scenario.

In a first aspect, an embodiment of the present disclosure provides an interaction method, applied to a target execution component, where the target execution component is one of a plurality of execution components, and one execution component corresponds to one input device, and the method includes:

receiving a trigger request, where the trigger request is sent by a target input device, the target execution component corresponds to the target input device, a state of the target execution component is active, and a state of each remaining execution component in the plurality of execution components except the target execution component is inactive;

caching the trigger request in a preset action queue, and performing trigger signal collision detection based on a UI after receiving an update instruction;

obtaining, according to a preset sequence, a trigger request from the preset action queue as a trigger request to be executed, after the trigger signal collision detection is performed; and calling, according to the trigger request to be executed, a corresponding action execution interface to process a trigger event, and displaying a processed result of the action execution interface on the UI.

In a possible implementation, before calling, according to the trigger request to be executed, the corresponding action execution interface to process the trigger event, further including:

determining whether an action triggered by a trigger request currently executed is within an action cycle; and the calling, according to the trigger request to be executed, the corresponding action execution interface to process the trigger event includes:

if the action triggered by the trigger request currently executed is not within the action cycle, calling, according to the trigger request to be executed, the corresponding action execution interface to process the trigger event.

In a possible implementation, after determining whether the action triggered by the trigger request currently executed is within the action cycle, further including:

if the action triggered by the trigger request currently executed is within the action cycle, determining whether an action triggered by the trigger request to be executed and the action triggered by the trigger request currently executed are mutually exclusive; and the calling, according to the trigger request to be executed, the corresponding action execution interface to process the trigger event includes:

if the action triggered by the trigger request to be executed and the action triggered by the trigger request currently executed are not mutually exclusive, calling, according to the trigger request to be executed, the corresponding action execution interface to process the trigger event; and if the action triggered by the trigger request to be executed and the action triggered by the trigger request currently executed are mutually exclusive, after the trigger request currently executed is executed, calling, according to the trigger request to be executed, the corresponding action execution interface to process the trigger event.

In a possible implementation, the trigger request carries an activation identifier, and the activation identifier is used to indicate whether the action triggered by the trigger request is an activation action; and the determining whether the action triggered by the trigger request currently executed is within the action cycle includes:

determining whether the action triggered by the trigger request currently executed is the activation action according to the activation identifier in the trigger request currently executed; and if the action triggered by the trigger request currently executed is the activation action, determining that the action triggered by the trigger request currently executed is within the action cycle.

In a possible implementation, the determining whether the action triggered by the trigger request to be executed and the action triggered by the trigger request currently executed are mutually exclusive, including:

obtaining a type of the action triggered by the trigger request to be executed and a type of the action triggered by the trigger request currently executed;

determining whether the type of the action triggered by the trigger request to be executed is consistent with the type of the action triggered by the trigger request currently executed; and if the type of the action triggered by the trigger request to be executed is consistent with the type of the action triggered by the trigger request currently executed, determining that the action triggered by the trigger request to be executed and the action triggered by the trigger request currently executed are not mutually exclusive.

In a possible implementation, after the trigger signal collision detection is performed, and before obtaining, according to the preset sequence, the trigger request from the preset action queue as the trigger request to be executed, further including:

calling a corresponding hover processing interface to process a hover event according to a node where a trigger signal collides with the UI in a previous frame and which is detected through the trigger signal collision detection and according to a node where the trigger signal collides with the UI in a current frame and which is detected through the trigger signal collision detection, and displaying a processed result of the hover processing interface on the UI.

In a possible implementation, the hover processing interface includes a hover entry interface, a hover stop interface, and a hover end interface;

the calling the corresponding hover processing interface to process the hover event according to the node where the trigger signal collides with the UI in the previous frame and which is detected through the trigger signal collision detection and according to the node where the trigger signal collides with the UI in the current frame and which is detected through the trigger signal collision detection includes:

comparing the node where the trigger signal collides with the UI in the previous frame and the node where the trigger signal collides with the UI in the current frame;

according to a node, in a comparison result, which is not among nodes where the trigger signal collides with the UI in the previous frame, but is among nodes where the trigger signal collides with the UI in the current frame, calling the hover entry interface to process the hover event;

according to a node, in the comparison result, which is among the nodes where the trigger signal collides with the UI in the previous frame, and is among the nodes where the trigger signal collides with the UI in the current frame, calling the hover stop interface to process the hover event; and according to a node, in the comparison result, which is among the nodes where the trigger signal collides with the UI in the previous frame, and is not among the nodes where the trigger signal collides with the UI in the current frame, calling the hover end interface to process the hover event.

In a possible implementation, the calling, according to the trigger request to be executed, the corresponding action execution interface to process the trigger event includes:

obtaining a type of an action triggered by the trigger request to be executed;

determining the corresponding action execution interface to be called according to the type of the action triggered by the trigger request to be executed; and calling the corresponding action execution interface to process the trigger event.

In a possible implementation, the target execution component interacts with an management system; and the receiving the trigger request includes:

receiving the trigger request sent by the management system, where the trigger request is received by the management system from the target input device, and the trigger request is used to instruct the management system to set the state of the target execution component to be active, and set the state of each of the remaining execution components in the plurality of execution components except the target execution component are to be inactive.

In a possible implementation manner, the trigger signal is ray.

In a second aspect, an embodiment of the present disclosure provides an interaction apparatus, applied to a target execution component, where the target execution component is one of a plurality of execution components, and one execution component corresponds to one input device, and the apparatus includes:

a receiving module, configured to receive a trigger request, where the trigger request is sent by a target input device, the target execution component corresponds to the target input device, a state of the target execution component is active, and a state of each remaining execution component in the plurality of execution components except the target execution component is inactive;

a processing module, configured to cache the trigger request in a preset action queue, and perform trigger signal collision detection based on a UI after receiving the update instruction;

an obtaining module, configured to obtain, according to a preset sequence, a trigger request from the preset action queue as a trigger request to be executed, after the trigger signal collision detection is performed; and a calling module, configured to call, according to the trigger request to be executed, a corresponding action execution interface to process a trigger event, and display a processed result of the action execution interface on the UI.

In a possible implementation, the calling module is specifically configured to:

determine whether an action triggered by a trigger request currently executed is within the action cycle; and if the action triggered by the trigger request currently executed is not within the action cycle, call, according to the trigger request to be executed, the corresponding action execution interface to process the trigger event.

In a possible implementation, the calling module is specifically configured to:

if the action triggered by the trigger request currently executed is within the action cycle, determine whether an action triggered by the trigger request to be executed and the action triggered by the trigger request currently executed are mutually exclusive;

if the action triggered by the trigger request to be executed and the action triggered by the trigger request currently executed are not mutually exclusive, call, according to the trigger request to be executed, the corresponding action execution interface to process the trigger event; and if the action triggered by the trigger request to be executed and the action triggered by the trigger request currently executed are mutually exclusive, after the trigger request currently executed is executed, call, according to the trigger request to be executed, the corresponding action execution interface to process the trigger event.

In a possible implementation, the trigger request carries an activation identifier, and the activation identifier is used to indicate whether the action triggered by the trigger request is an activation action; and the calling module is specifically configured to:

determine whether the action triggered by the trigger request currently executed is the activation action according to the activation identifier in the trigger request currently executed; and if the action triggered by the trigger request currently executed is the activation action, determine that the action triggered by the trigger request currently executed is within the action cycle.

In a possible implementation, the calling module is specifically configured to:

obtain a type of the action triggered by the trigger request to be executed and a type of the action triggered by the trigger request currently executed;

determine whether the type of the action triggered by the trigger request to be executed is consistent with the type of the action triggered by the trigger request currently executed; and if the type of the action triggered by the trigger request to be executed is consistent with the type of the action triggered by the trigger request currently executed, determine that the action triggered by the trigger request to be executed and the action triggered by the trigger request currently executed are not mutually exclusive.

In a possible implementation, after the trigger signal collision detection is performed, and before obtaining, according to the preset sequence, the trigger request from the preset action queue as the trigger request to be executed, the obtaining module is further configured to:

call a corresponding hover processing interface to process a hover event according to a node where a trigger signal collides with the UI in a previous frame and which is detected through the trigger signal collision detection and according to a node where the trigger signal collides with the UI in a current frame and which is detected through the trigger signal collision detection, and display a processed result of the hover processing interface on the UI.

In a possible implementation, the hover processing interface includes a hover entry interface, a hover stop interface, and a hover end interface; and the obtaining module is specifically configured to:

compare the node where the trigger signal collides with the UI in the previous frame and the node where the trigger signal collides with the UI in the current frame;

according to a node, in a comparison result, which is not among nodes where the trigger signal collides with the UI in the previous frame, but is among nodes where the trigger signal collides with the UI in the current frame, call the hover entry interface to process the hover event;

according to a node, in the comparison result, which is among the nodes where the trigger signal collides with the UI in the previous frame, and is among the nodes where the trigger signal collides with the UI in the current frame, call the hover stop interface to process the hover event; and according to a node, in the comparison result, which is among the nodes where the trigger signal collides with the UI in the previous frame, and is not among the nodes where the trigger signal collides with the UI in the current frame, call the hover end interface to process the hover event.

In a possible implementation, the calling module is specifically configured to:

obtain a type of an action triggered by the trigger request to be executed;

determine the corresponding action execution interface to be called according to the type of the action triggered by the trigger request to be executed; and call the corresponding action execution interface to process the trigger event.

In a possible implementation, the target execution component interacts with a management system; and the receiving module is specifically configured to:

receive the trigger request sent by the management system, where the trigger request is received by the management system from the target input device, and the trigger request is used to instruct the management system to set the state of the target execution component to be active, and set the state of each of the remaining execution components in the plurality of execution components except the target execution component to be inactive.

In a possible implementation, the trigger signal is ray.

In a third aspect, an embodiment of the present disclosure provides a target execution component, including:

a processor;

a memory; and a computer program;

where the computer program is stored in the memory and is configured to be executed by the processor, and the computer program includes instructions for performing the method of the first aspect.

In a fourth aspect, an embodiment of the present disclosure provides a computer-readable storage medium, where the computer-readable storage medium stores a computer program, and the computer program causes a server to perform the method of the first aspect.

In a fifth aspect, an embodiment of the present disclosure provides a computer program product, including computer instructions to be executed by a processor to perform the method of the first aspect.

In a sixth aspect, an embodiment of the present disclosure provides a computer program, where the computer program is stored in a readable storage medium, and at least one processor of an electronic device can read the computer program from the readable storage medium, the at least one processor executes the computer program, so that the electronic device executes the method of the first aspect.

In the interaction method and apparatus, and the storage medium provided by the embodiments of the present disclosure, the method includes: an execution component receives a trigger request sent by an input device, where the execution component corresponds to the input device. A state of the execution component is active, and states of other execution components are inactive. Thus, only one input device is active (can trigger an event) at the same time, so that a UI only responds to one trigger at the same time. And then, according to the trigger request, trigger signal collision detection and event processing are performed, and a processed result is displayed on the UI. It solves the problem that how the UI responds correctly for the interaction between multiple input devices and the UI in a XR scenario, and ensures the UI interaction in the XR scenario is correct, fast and complete. Moreover, in the embodiment of the present disclosure, after receiving the trigger request sent by the management system, the execution component caches the trigger request in a preset action queue. In this way, on the one hand, it can manage the trigger requests with a mutually exclusive relationship to ensure that the two action cycles for the trigger requests are not overlapped. On the other hand, within the action cycle, even if the trigger request is not sent every frame, it can ensure that the execution component generates a trigger event every frame, so that the UI can completely process the corresponding event.

BRIEF DESCRIPTION OF DRAWINGS

In order to more clearly illustrate the embodiments of the present disclosure or the technical solutions, the following briefly introduces drawings needed to be used in the description of the embodiments. Obviously, the drawings in the following description are only some embodiments of the present disclosure, and for those of ordinary skill in the art, other drawings can also be obtained according to these drawings without any creative effort.

DESCRIPTION OF EMBODIMENTS

Figure 1:
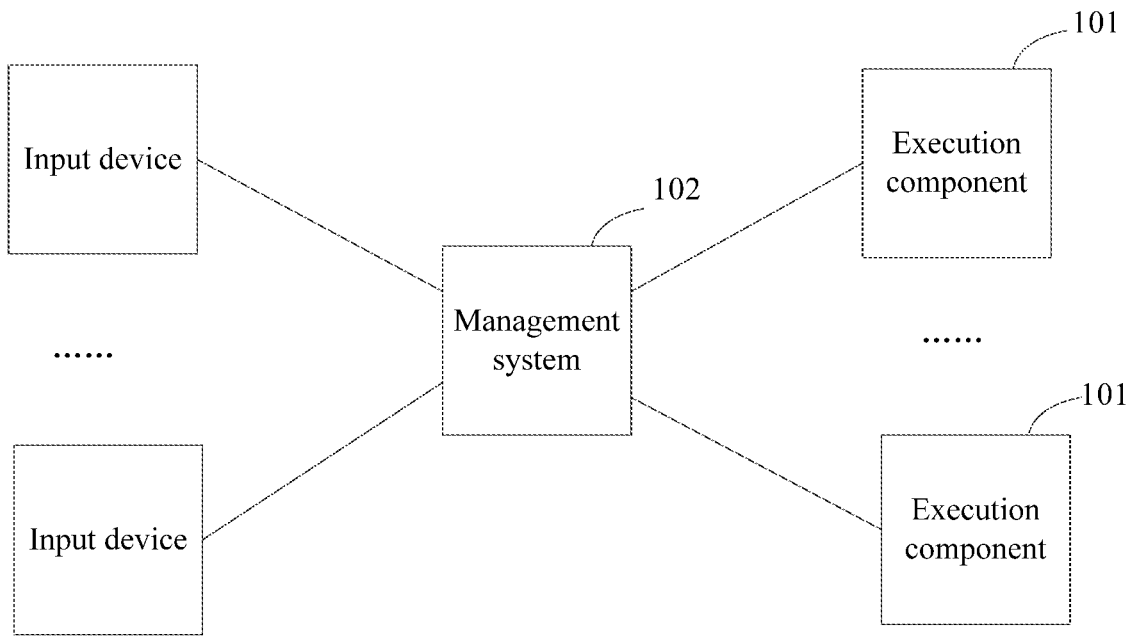
FIG. 1 is a schematic diagram of an interaction system architecture provided by an embodiment of the present disclosure.

The technical solutions in the embodiments of the present disclosure will be clearly and completely described below with reference to the drawings in the embodiments of the present disclosure. Obviously, the described embodiments are only a part of the embodiments of the present disclosure, but not all of the embodiments. Based on the embodiments in the present disclosure, all other embodiments obtained by those of ordinary skill in the art without creative effort shall fall within the protection scope of the present disclosure.

The terms "first", "second", "third", "fourth", etc. (if present) in the description and claims of the present disclosure as well as the drawings are used to distinguish similar objects and are not necessarily used to describe a specific order or sequence. It is to be understood that the data so used may be interchanged under appropriate circumstances such that the embodiments of the present disclosure described herein can be practiced in sequences other than those illustrated or described herein. Furthermore, the terms "including" and "comprising" and any variations thereof are intended to cover non-exclusive inclusion. For example, a process, a method, a system, a product or a device including a series of steps or units is not necessarily limited to those expressly listed steps or units, but also may include other steps or units not expressly listed or inherent to the process, the method, the product or the device.

XR technology includes augmented reality (AR), VR, and mixed reality (MR). It integrates virtual content and a real scenario through a hardware device and multiple technical means. In an XR scenario, there are two interaction methods according to distance: one is near-field interaction, where the user touches an object through a finger click or with a process; and the other is far-field interaction, where the user generally uses ray to perform collision detection on the virtual object to further complete an entire trigger cycle. Where, for the latter, more than one input device may exist at the same time in the XR scenario, and a UI in the scenario can only respond to one trigger at the same time. Therefore, a mechanism is needed to manage interaction between multiple input devices and the UI.

Therefore, an embodiment of the present disclosure proposes an interaction method, in which a trigger request sent by an input device is received through an execution component, and the execution component corresponds to the input device. The state of the execution component is active and the states of other execution components are inactive, which makes only one input device be active (can trigger events) at the same time, so that the UI only responds to one trigger at the same time. And then the trigger signal collision detection and event processing are performed according to the trigger request, and the processed result is displayed on the UI to ensure correct, fast and complete interaction between multiple input devices and the UI in the XR scenario.

In a possible implementation, the interaction method provided by the embodiment of the present disclosure may be applied to an interaction system shown in FIG. 1. In FIG. 1, the interaction system architecture may include an execution component 101. The execution component 101 is one of a plurality of execution components, and one execution component corresponds to one input device. Here, it can be understood that an execution component is bound to an input device, and the execution component only processes the relevant information sent by the input device bound to it. For example, there are execution components 1, 2, and 3 and input devices A, B, and C, and the execution component 1 corresponds to the input device A. The execution component 1 receives a trigger request sent by the input device A, and can perform trigger signal collision detection and event processing and so on based on the trigger request.

In a specific implementation, the execution component 101 receives a trigger request sent by the corresponding input device, performs trigger signal collision detection and event processing based on the trigger request, and displays the processed result on the UI, which solves the problem of how the UI responds correctly for interaction between multiple input devices and the UI in the XR scenario. The state of the execution component 101 is active, and the states of other execution components are inactive, so that only one input device is active (can trigger events) at the same time, and the UI only responds to one trigger at the same time.

In addition, the interaction system architecture may include a management system 102, and the execution component 101 may interact with the management system 102 to manage interaction between the multiple input devices and the UI.

The management system 102 may receive each trigger request of each input device. If the user sends a trigger request through an input device, the management system 102 receives the trigger request, and manages multiple execution components according to the trigger request. For example, the management system 102 sets the state of the execution component corresponding to the input device to be active, and sets the states of other execution components to be inactive, and so on. This makes only one input device is active at the same time, so that the UI only responds to one trigger at the same time. Then, the management system 102 may also sends the trigger request to the execution component corresponding to the input device. For example, the execution component is the execution component 101, and the execution component 101 performs trigger signal collision detection and event processing based on the trigger request. This ensures correct, fast and complete interaction between multiple input devices and the UI in the XR scenario.

It should be noted that the system architectures and the business scenarios described in the embodiments of the present disclosure are for the purpose of illustrating the technical solutions of the embodiments of the present disclosure more clearly, and do not constitute a limitation on the technical solutions provided by the embodiments of the present disclosure. Those of ordinary skill in the art know that, with the evolution of the system architectures and the emergence of new business scenarios, the technical solutions provided by the embodiments of the present disclosure are also applicable to similar technical problems.

The technical solutions of the present disclosure are described below by taking several embodiments as examples, and the same or similar concepts or processes may not be repeated in some embodiments.

Figure 2:
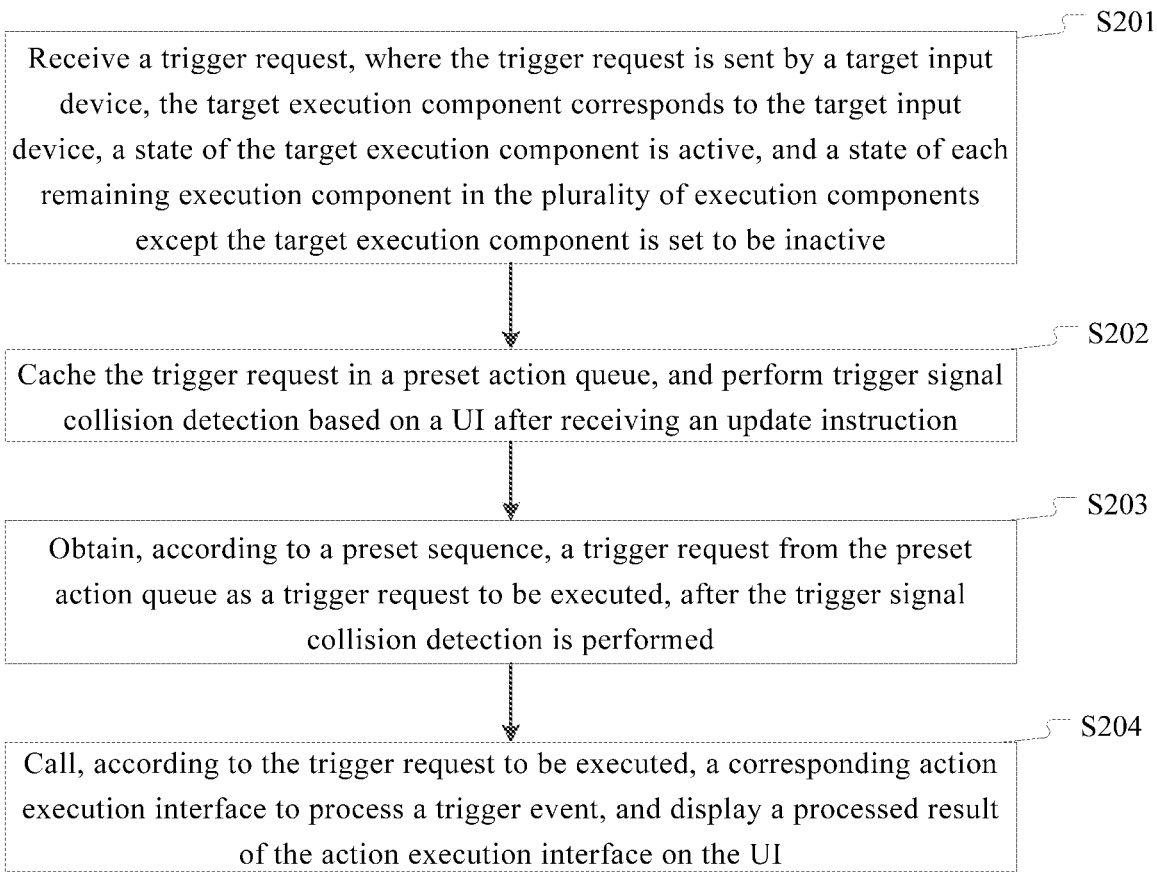
FIG. 2 is a schematic flowchart of an interaction method provided by an embodiment of the present disclosure.

FIG. 2 is a schematic flowchart of an interaction method provided by an embodiment of the present disclosure. The execution body of this embodiment takes the execution component in FIG. 1 as an example, and the specific execution body can be determined according to the actual application scenario, and the embodiment of the present disclosure does not specifically limit to this. For the convenience of description, the execution component in FIG. 2 can be understood as a target execution component, and the target execution component is one of a plurality of execution components, and one execution component corresponds to one input device. As shown in FIG. 2, the interaction method provided by the embodiment of the present disclosure may include the following.

S201: receive a trigger request, where the trigger request is sent by a target input device, the target execution component corresponds to the target input device, a state of the target execution component is active, and a state of each remaining execution component in the plurality of execution components except the target execution component is set to be inactive.

Here, the user can send a trigger request through a target input device, the target input device can be any input device, the input device corresponds to an execution component, that is, is bound to an execution component, and the execution component processes the relevant information sent by the target input device.

The trigger request may be a trigger request received by the target execution component from the management system. That is, the management system receives the trigger request sent by the target input device, and then forwards the trigger request to the target execution component, so that the target execution component can accurately process the relevant information sent by the corresponding input device. Here, the management system can manage a plurality of execution components including the target execution component, for example, the controlling forwarding corresponding information to each execution component, or controlling the state of the execution component to set the state of the target execution component to be active and set the state of each remaining execution component except the target execution component to be inactive. So that only one input device is active (can trigger events) at the same time, and the UI only responds to one trigger at the same time.

Here, the trigger request may carry an identifier of the target input device. Taking two input devices as an example, if the two input devices are a left handle and a right handle, respectively, and the target input device is the right handle, the trigger request may carry the identifier of the right handle. The management system receives each trigger request from each input device. After receiving the trigger request from the target input device, the management system may determine the target execution component corresponding to the target input device according to the identifier of the target input device carried in the trigger request, and then set the state of the target execution component to be active, and set the state of each remaining execution component except the target execution component to be inactive. So that only one input device is active (can trigger events) at the same time, and the UI only responds to one trigger at the same time to meet the actual application needs.

In the embodiment of the present disclosure, the management system may pre-store a corresponding relationship between the identifiers of the input devices and the execution components. In this way, after receiving the trigger request of the target input device, the target execution component corresponding to the target input device is determined according to the corresponding relationship and the trigger request carrying the identifier of the target input device, which is simple and convenient. The identifier may be a name and a serial number of the input device and other information that can uniquely identify the identity of the device.

In addition, the input device corresponding to the execution component in the inactive state is triggered. For example, the execution component corresponding to the left handle is in an inactive state, and the execution component corresponding to the right handle is in an active state. When the left handle is triggered, the management system will first cancel and clear all trigger events of the currently active handle (right handle), and, at the same time, set the execution component corresponding to the left handle to be active to respond to the corresponding trigger to meet the actual application needs. The user is unaware of whether the handle is active. This improves the user experience.

S202: cache the trigger request in a preset action queue, and perform trigger signal collision detection based on a UI after receiving an update instruction.

Here, the target execution component caches the trigger request in the preset action queue. On the one hand, it can manage the trigger requests with a mutually exclusive relationship to ensure that the two action cycles for the trigger requests are not overlapped. On the other hand, within the action cycle, even if the trigger request is not sent every frame, it can ensure that the execution component generates a trigger event every frame, so that the UI can completely process the corresponding event.

In the embodiment of the present disclosure, the trigger signal may be a collision trigger signal, such as ray. After receiving the update instruction, the target execution component can track the position and the attitude of the target input device to determine the starting point and the direction of the ray, update the position and the direction of the ray, etc., and perform ray collision detection in each frame to determine the node where the ray collides with the UI, and display the node, where a collision is occurred, on the UI, so that the user can know the state of the input device.

In addition, after determining the node where the trigger signal collides with the UI, the target execution component may also store the node where the trigger signal collides with the UI, so as to facilitate subsequent processing of related events based on the stored node where a collision is occurred.

S203: obtain, according to a preset sequence, a trigger request from the preset action queue as a trigger request to be executed, after the trigger signal collision detection is performed.

Here, the preset sequence can be set according to the actual situation. For example, it is first-in-first-out, that is, after the trigger signal collision is performed, the target execution component obtains a trigger request from the preset action queue in the sequence of first-in-first-out as a trigger request to be executed, so as to meet various application needs.

Figure 3:
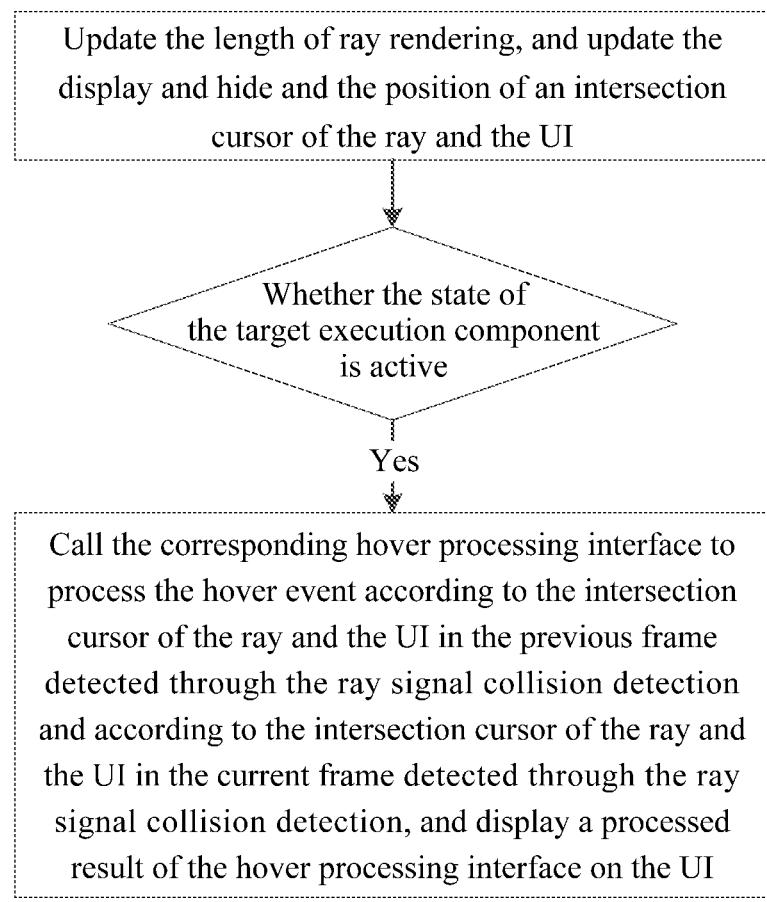
FIG. 3 is a schematic diagram of a hover event processing provided by an embodiment of the present disclosure.

As an example, taking the trigger signal as ray as an example, as shown in FIG. 3, after ray collision detection is performed, and before obtaining, according to a preset sequence, a trigger request from a preset action queue as a trigger request to be executed, the target execution component can also update the length of ray rendering, update the display and hide and the position of an intersection cursor of the ray and the UI, and when the state of the target execution component is active, call the corresponding hover processing interface to process the hover event according to the intersection cursor of the ray and the UI in the previous frame detected through the trigger signal collision detection and according to the intersection cursor of the ray and the UI in the current frame detected through the trigger signal collision detection, and display the processed result of the hover processing interface on the UI. This solves the hover event processing for interaction between multiple input devices and the UI in the XR scenario.

The hover processing interface includes a hover entry interface, a hovering stop interface, and a hovering end interface. The target execution component can compare the node where the trigger signal collides with the UI in the previous frame with the node where the trigger signal collides with the UI in the current frame. According to a node, in a the comparison result, which is not among the nodes where the trigger signal collides with the UI in the previous frame, but is among the nodes where the trigger signal collides with the UI in the current frame, the hover entry interface is called to process the hover event; according to a node, in a the comparison result, which is among the nodes where the trigger signal collides with the UI in the previous frame and is among the nodes where the trigger signal collides with the UI in the current frame, the hover stop interface is called to process the hover event; and according to a node, in a the comparison result, which is among the nodes where the trigger signal collides with the UI in the previous frame, but is not among the nodes where the trigger signal collides with the UI in the current frame, the hover end interface is called to process the hover event. That is, different events call different interface processing, so as to successfully process the corresponding event through the called interface. For example, the nodes where the trigger signal collides with the UI in the previous frame includes A, B, and C, and the nodes where the trigger signal collides with the UI in the current frame includes A, C, and D, then the hover interface is called on A and C to process the hover event, the hover end interface is called on B to process the hover event, and the hover entry interface is called on D to process the hover event.

S204: call, according to the trigger request to be executed, a corresponding action execution interface to process a trigger event, and display a processed result of the action execution interface on the UI.

Figure 4:
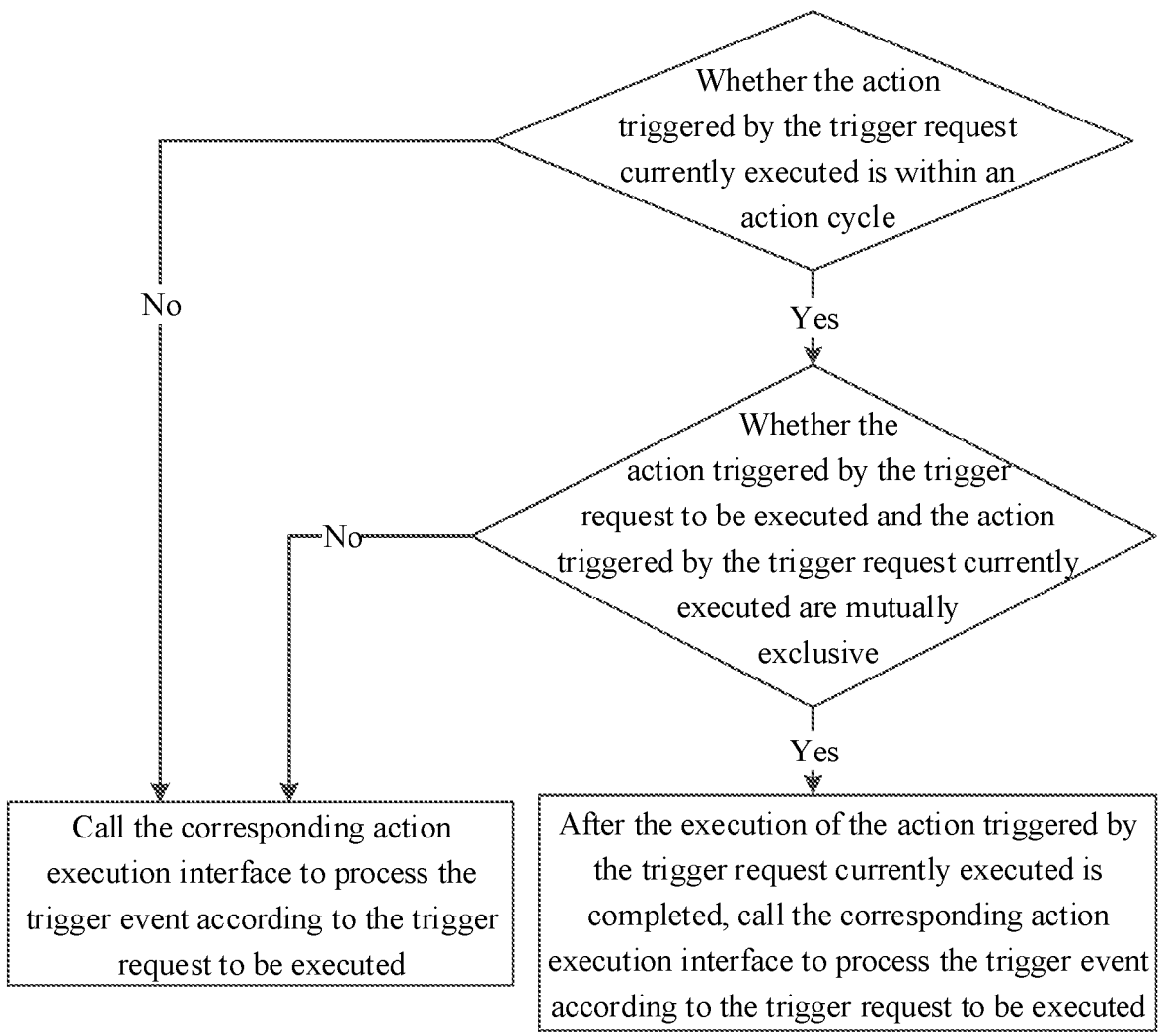
FIG. 4 is a schematic diagram of a trigger event processing provided by an embodiment of the present disclosure.

As an example, as shown in FIG. 4, before calling, according to the trigger request to be executed, the corresponding action execution interface to process the trigger event, the target execution component may also determine whether the action triggered by the trigger request currently executed is within the action cycle. If the action triggered by the trigger request currently executed is not within the action cycle, it means that the action triggered by the trigger request currently executed may be executed or the user has sent an end request, and it is no mutual exclusion with the action triggered by the trigger request to be executed. At this time, the target execution component can call the corresponding action execution interface to process the trigger event according to the trigger request to be executed.

Here, if the action triggered by the trigger request currently executed is within the action cycle, the target execution component can further determine whether the action triggered by the trigger request to be executed and the action triggered by the trigger request currently executed are mutually exclusive. If it is not mutually exclusive, the target execution component calls the corresponding action execution interface to process the trigger event according to the trigger request to be executed. If it is mutually exclusive, after the execution of the action triggered by the trigger request currently executed is completed, the target execution component calls the corresponding action execution interface to process the trigger event according to the trigger request to be executed.

For non-mutually exclusive trigger requests, the target execution components can perform processing in parallel to meet application needs. For mutually exclusive trigger requests, the target execution component processes another trigger request after processing the first trigger request to ensure the integrity of the action cycle.

In the embodiment of the present disclosure, when determining whether the action triggered by the trigger request to be executed and the action triggered by the trigger request currently executed are mutually exclusive, the target execution component can obtain the type of the action triggered by the trigger request to be executed and the type of the action triggered by the trigger request currently executed, and then determine whether the type of the action triggered by the trigger request to be executed is consistent with the type of the action triggered by the trigger request currently executed. If they are consistent, it is determined that the action triggered by the trigger request to be executed and the action triggered by the trigger request currently executed are not mutually exclusive. If they are inconsistent, it is determined that the action triggered by the trigger request to be executed and the action triggered by the trigger request currently executed are mutually exclusive. The subsequent steps are executed based on the determining result to ensure that subsequent processing proceeds normally. The trigger request may carry the type of the triggered action, and the target execution component obtains the type of the action triggered in the trigger request to be executed and the type of the action triggered in the trigger request currently executed, according to the type of the action carried in the trigger request to be executed and the type of the action carried in the trigger request currently executed.

In addition, the trigger request may carry an activation identifier, where the activation identifier is used to indicate whether the action triggered by the trigger request is an activation action. When determining whether the action triggered by the trigger request currently executed is within the action cycle, the target execution component can determine whether the action triggered by the trigger request currently executed is an activation action according to the activation identifier carried in the trigger request currently executed. If the action triggered by the trigger request currently executed is an activation action, the target execution component determines that the action triggered by the trigger request currently executed is within the action cycle. For example, taking the button on the handle as an example, the user sends a trigger request by pressing the button, the trigger request carries an activation identifier, and the activation identifier is used to indicate that the action triggered by the trigger request is an activation action (that is, when the button is pressed, the activation identifier carried in the trigger request indicates that the action triggered by the trigger request is an activation action; while the button is lifted, the activation identifier carried in the trigger request indicates that the action triggered by the trigger request is not an activation action). The management system receives the trigger request, and sends the trigger request to the corresponding execution component, and the execution component determines whether the action triggered by the trigger request is an activation action according to the activation identifier, so as to accurately determine whether the action triggered by the trigger request is with the action cycle.

In the embodiment of the present disclosure, the target execution component caches received trigger requests in a queue, and then takes out a trigger request from the queue as a trigger request to be executed for processing. Under the condition of ensuring the integrity of the action cycle, the target execution component calls the corresponding action execution interface to process the trigger event, and displays the processed result of the action execution interface on the UI.

When calling the corresponding action execution interface to process the trigger event, the target execution component can obtain the type of the action triggered by the trigger request to be executed. And then, according to the type, the target execution component determines the corresponding action execution interface to be called, and then calls the corresponding action execution interface to process the trigger event to ensure accurate subsequent processing. Here, the types may include click, joystick, and the like. The target execution component determines the action execution interface as click, joystick or the like according to the type, so as to call the action execution interface of click, joystick or the like to process the event such as the click, joystick or the like.

Here, the action execution interface may include an interactive component such as a UI component with specific function, like a common button (Button), a progress bar (Slider), a single check button (Tab), a scroll view (ScrollView), and the like, so as to implement the respective functional logic in the interface, respond to the trigger of the input device, and open up the complete UI interaction link.

In the embodiment of the present disclosure, a trigger request sent by an input device is received through an execution component, where the execution component corresponds to the input device. A state of the execution component is active, and states of other execution components are inactive. Thus, only one input device is active (can trigger an event) at the same time, and a UI only responds to one trigger at the same time. And then, according to the trigger request, trigger signal collision detection and event processing are performed, and a processed result is displayed on the UI. It solves the problem that how the UI responds correctly for the interaction between multiple input devices and the UI in a XR scenario, and ensures the UI interaction in the XR scenario is correct, fast and complete. Moreover, in the embodiment of the present disclosure, after receiving the trigger request sent by the management system, the execution component caches the trigger request in a preset action queue. In this way, on the one hand, it can manage the trigger requests with a mutually exclusive relationship to ensure that the two action cycles for the trigger requests are not overlapped. On the other hand, within the action cycle, even if the trigger request is not sent every frame, it can ensure that the execution component generates a trigger event every frame, so that the UI can completely process the corresponding event.

Figure 5:
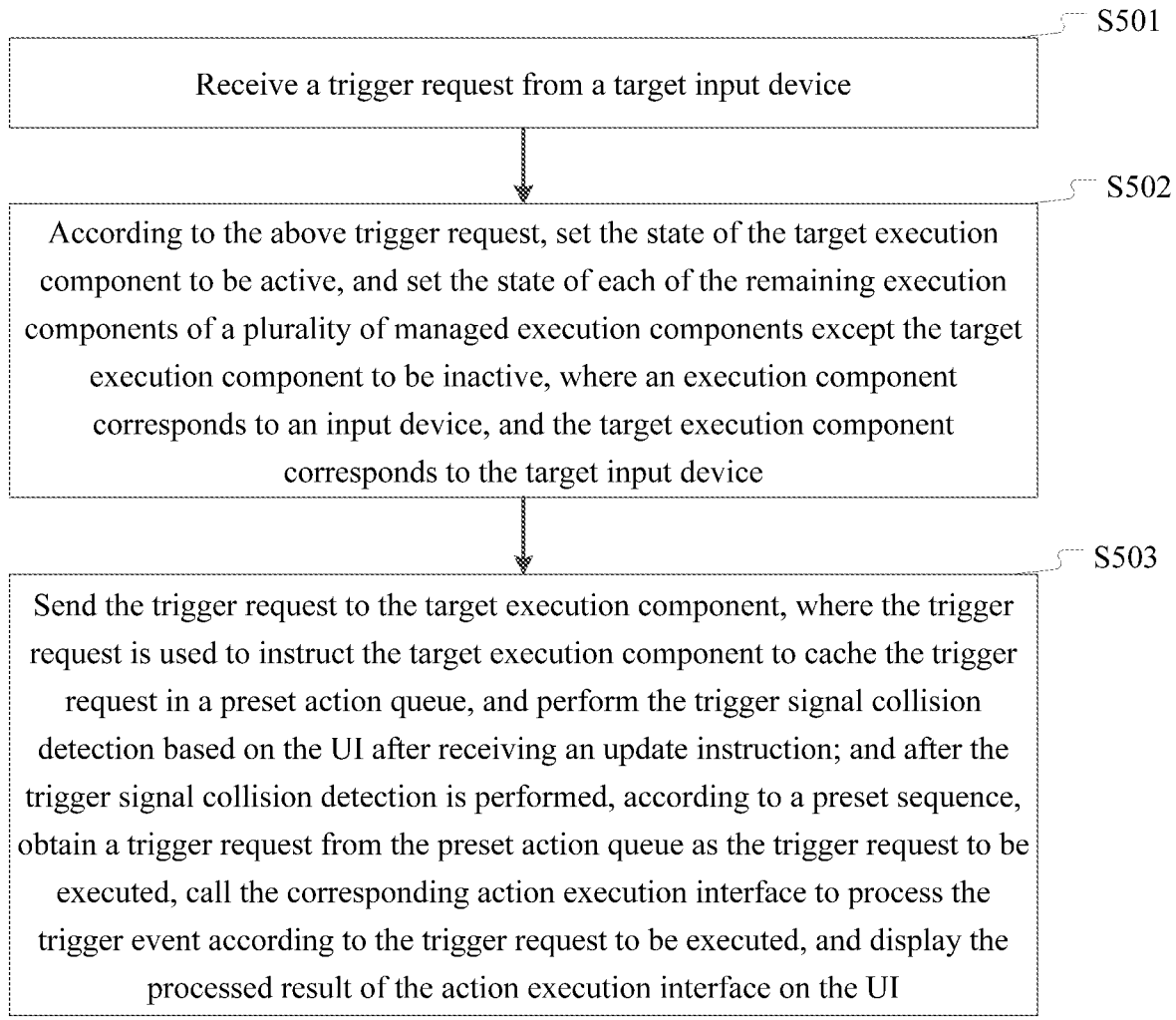
FIG. 5 is a schematic flowchart of another interaction method provided by an embodiment of the present disclosure.

In addition, taking an interaction between a target execution component and a management system, the management system receiving a trigger request sent by a target input device and forwarding the trigger request to the target execution component as an example, FIG. 5 provides a schematic flowchart of another interaction method, that is, the flow of an interaction method corresponding to the management system. Where the relevant description refers to FIG. 2, which is not repeated here. As shown in FIG. 5, the method may include the following.

S501: receive a trigger request from a target input device.

S502: according to the trigger request, set the state of the target execution component to be active, and set the state of each of the remaining execution components of a plurality of managed execution components except the target execution component to be inactive, where an execution component corresponds to an input device, and the target execution component corresponds to the target input device.

Here, one input device corresponds to one execution component, that is, one input device is bound to one execution component. In this way, the management system can set the state of the target execution component corresponding to the target input device to be active, and set the states of other execution components to be inactive. So that only one input device is active (can trigger events) at the same time, and the UI only responds to one trigger at the same time to meet the actual application needs.

S503: send the trigger request to the target execution component, where the trigger request is used to instruct the target execution component to cache the trigger request in a preset action queue, and perform the trigger signal collision detection based on the UI after receiving an update instruction; and after the trigger signal collision detection is performed, according to a preset sequence, obtain a trigger request from the preset action queue as the trigger request to be executed, call the corresponding action execution interface to process the trigger event according to the trigger request to be executed, and display the processed result of the action execution interface on the UI.

After setting the state of the execution component to be active, the management system sends the trigger request to the target execution component, so that the target execution component caches the received trigger request in a queue, then takes out a trigger request from the queue as a trigger request to be executed for processing, under the condition of ensuring the integrity of the action cycle, calls a corresponding action execution interface to process the trigger event, and displays the processed result of the action execution interface on the UI.

In the embodiment of the present disclosure, through interacting with multiple execution components, the management system manages the interaction between multiple input devices and the UI. Where one execution component corresponds to one input device. After receiving a trigger request from an input device, the management system sets the state of the execution component corresponding to the input device to be active, and sets the states of other execution components to be inactive. So that only one input device is active (can trigger events) at the same time. And then the management system sends the trigger request to the corresponding execution component. The execution component performs trigger signal collision detection and event processing, and displays the processed results on the UI to ensure interaction between multiple input devices and the UI in the XR scenario are correct, quick and complete.

Figure 6:
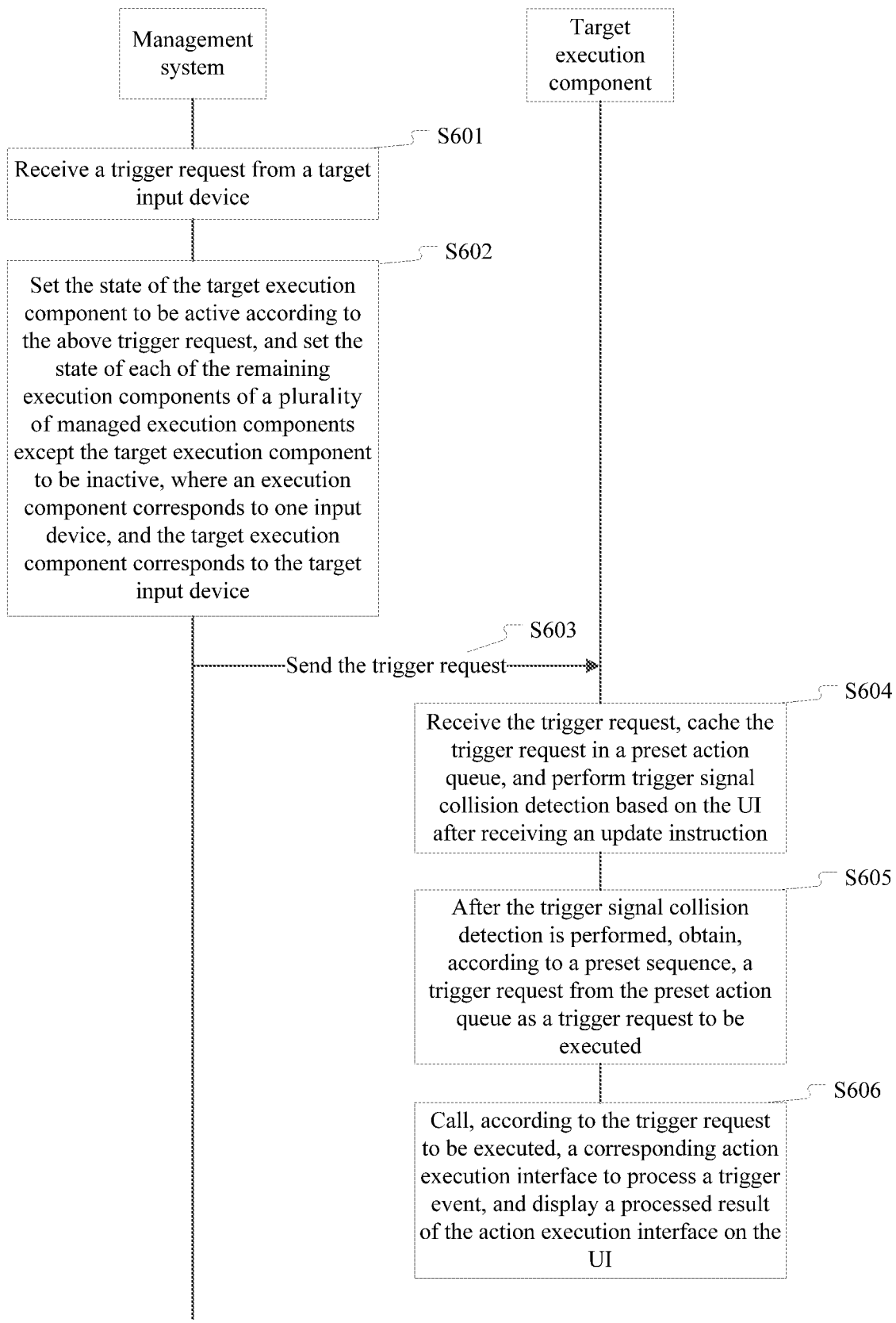
FIG. 6 is a schematic flowchart of yet another interaction method provided by an embodiment of the present disclosure.

In addition, FIG. 6 is a schematic flowchart of yet another interaction method provided by an embodiment of the present disclosure. This embodiment describes the process of the interaction method from the interaction between the management system and the execution component. As shown in FIG. 6, the method may include the following.

S601: the management system receives a trigger request from a target input device.

S602: the management system sets the state of the target execution component to be active according to the trigger request, and sets the state of each of the remaining execution components of a plurality of managed execution components except the target execution component to be inactive, where an execution component corresponds to one input device, and the target execution component corresponds to the target input device.

S603: send the trigger request to the target execution component.

S604: the target execution component receives the trigger request, caches the trigger request in a preset action queue, and performs trigger signal collision detection based on the UI after receiving an update instruction.

The target execution component caches the trigger request in the preset action queue. On the one hand, it can manage the trigger requests with a mutually exclusive relationship to ensure that the two action cycles for the trigger requests are not overlapped. On the other hand, within an action cycle, even if the trigger request is not sent every frame, it can ensure that the execution component generates a trigger event every frame.

S605: after the trigger signal collision detection is performed, the target execution component obtains, according to a preset sequence, a trigger request from the preset action queue as a trigger request to be executed.

Here, after the trigger signal collision detection is performed, and before obtaining, according to the preset sequence, a trigger request from the preset action queue as the trigger request to be executed, the target execution component may also call a corresponding hover processing interface to process a hover event according to a node where a trigger signal collides with the UI in a previous frame and which is detected through the trigger signal collision detection and according to a node where the trigger signal collides with the UI in a current frame and which is detected through the trigger signal collision detection, and display a processed result of the hover processing interface on the UI.

The hover processing interface includes a hover entry interface, a hover stop interface, and a hover end interface. The target execution component can compare the node where the trigger signal collides with the UI in the previous frame and the node where the trigger signal collides with the UI in the current frame. According to a node, in a the comparison result, which is not among the nodes where the trigger signal collides with the UI in the previous frame, but is among the nodes where the trigger signal collides with the UI in the current frame, the hover entry interface is called to process the hover event; according to a node, in a the comparison result, which is among the nodes where the trigger signal collides with the UI in the previous frame and is among the nodes where the trigger signal collides with the UI in the current frame, the hover stop interface is called to process the hover event; and according to a node, in a the comparison result, which is among the nodes where the trigger signal collides with the UI in the previous frame, but is not among the nodes where the trigger signal collides with the UI in the current frame, the hover end interface is called to process the hover event.

S606: the target execution component calls, according to the trigger request to be executed, a corresponding action execution interface to process a trigger event, and displays a processed result of the action execution interface on the UI.

The target execution component can first determines whether the action triggered by the trigger request currently executed is within an action cycle. If the action triggered by the trigger request currently executed is not within the action cycle, the target execution component can call, according to the trigger request to be executed, the corresponding action execution interface to process the trigger event.

Here, if the action triggered by the trigger request currently executed is within the action cycle, the target execution component can further determine whether the action triggered by the trigger request to be executed and the action triggered by the trigger request currently executed are mutually exclusive. If it is not mutually exclusive, the target execution component calls the corresponding action execution interface to process the trigger event according to the trigger request to be executed. If it is mutually exclusive, after the execution of the action triggered by the trigger request currently executed is completed, the target execution component calls, according to the trigger request to be executed, the corresponding action execution interface to process the trigger event.

In the embodiment of the present disclosure, the target execution component may obtain the type of the action triggered by the trigger request to be executed and the type of the action triggered by the trigger request currently executed, and determine whether the action triggered by the trigger request to be executed and the action triggered by the trigger request currently executed are mutually exclusive by determining whether the two types are consistent. If the type of the action triggered by the trigger request to be executed is consistent with the type of the action triggered by the trigger request currently executed, the target execution component determines that the action triggered by the trigger request to be executed and the action triggered by the trigger request currently executed are not mutually exclusive; otherwise, it is determined that the action triggered by the trigger request to be executed and the action triggered by the trigger request currently executed are mutually exclusive.

In addition, the trigger request carries an activation identifier, and the activation identifier is used to indicate whether the action triggered by the trigger request is an activation action.

When determining whether the action triggered by the trigger request currently executed is within the action cycle, the target execution component can determine whether the action triggered by the trigger request currently executed is an activation action according to the activation identifier carried in the trigger request currently executed. If the action triggered by the trigger request currently executed is an activation action, the target execution component determines that the action triggered by the trigger request currently executed is within the action cycle.

When calling the corresponding action execution interface to process the trigger event, the target execution component can obtain the type of the action triggered by the trigger request to be executed. And then, according to the type, the target execution component determines the corresponding action execution interface to be called, and then calls the corresponding action execution interface to process the trigger event.

To sum up, the embodiment of the present disclosure, through interacting with multiple execution components, the management system manages the interaction between multiple input devices and the UI. Where one execution component corresponds to one input device. After receiving a trigger request from an input device, the management system sets the state of the execution component corresponding to the input device to be active, and sets the states of other execution components to be inactive. So that only one input device is active (can trigger events) at the same time and the UI only responds to one trigger at the same time. Then, the management system sends the trigger request to the execution component corresponding to the input device. After receiving the trigger request sent by the management system, the execution component caches the trigger request in a preset action queue. Whereby, it can manage the trigger requests with a mutually exclusive relationship to ensure that the two action cycles for the trigger requests are not overlapped. On the other hand, within the action cycle, even if the trigger request is not sent every frame, it can ensure that the execution component generates a trigger event every frame. In addition, the execution component performs trigger signal collision detection and event processing, and displays the processing results on the UI to ensure that the UI interaction in the XR scenario is correct, fast and complete.

Figure 7:
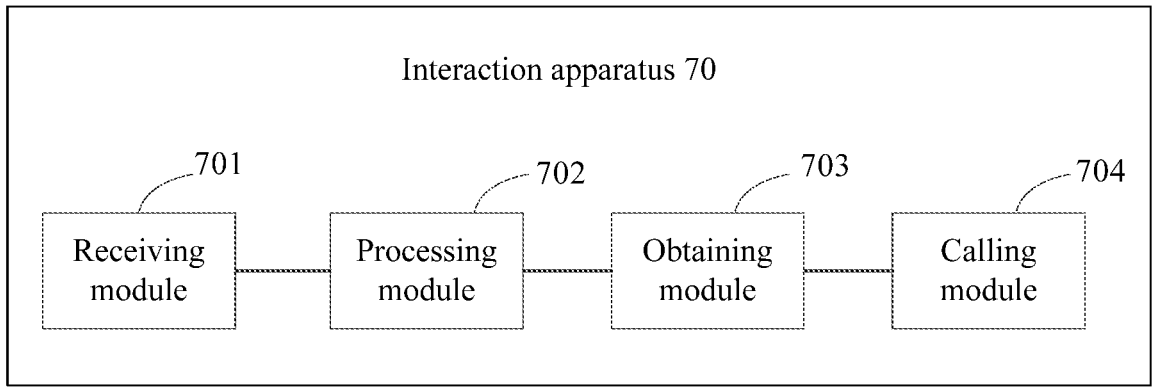
FIG. 7 is a schematic structural diagram of an interaction apparatus provided by an embodiment of the present disclosure.

Corresponding to the interaction method in the embodiment, FIG. 7 is a schematic structural diagram of an interaction apparatus 70 provided by an embodiment of the present disclosure. For convenience of explanation, only the parts related to the embodiment of the present disclosure are shown. The interaction apparatus 70 includes: a receiving module 701, a processing module 702, an obtaining module 703, and a calling module 704. The interaction apparatus 70 here may be the target execution component itself, or a chip or an integrated circuit that implements the function of the target execution component. It should be noted here that the division of the receiving module, the processing module, the obtaining module and the calling module is only a division of logical functions, two of which may be integrated or independent in physical.

The receiving module 701 is configured to receive a trigger request, where the trigger request is sent by a target input device, the target execution component corresponds to the target input device, a state of the target execution component is active, and a state of each remaining execution component in the plurality of execution components except the target execution component is inactive.

The processing module 702 is configured to cache the trigger request in a preset action queue, and perform trigger signal collision detection based on a UI after receiving the update instruction.

The obtaining module 703 is configured to obtain, according to a preset sequence, a trigger request from the preset action queue as a trigger request to be executed, after the trigger signal collision detection is performed.

The calling module 704 is configured to call, according to the trigger request to be executed, a corresponding action execution interface to process a trigger event, and display a processed result of the action execution interface on the UI.

In a possible implementation, the calling module 704 is specifically configured to:
determine whether an action triggered by a trigger request currently executed is within the action cycle; and
if the action triggered by the trigger request currently executed is not within the action cycle, call, according to the trigger request to be executed, the corresponding action execution interface to process the trigger event.

In a possible implementation, the calling module 704 is specifically configured to:
if the action triggered by the trigger request currently executed is within the action cycle, determine whether an action triggered by the trigger request to be executed and the action triggered by the trigger request currently executed are mutually exclusive;
if the action triggered by the trigger request to be executed and the action triggered by the trigger request currently executed are not mutually exclusive, call, according to the trigger request to be executed, the corresponding action execution interface to process the trigger event; and
if the action triggered by the trigger request to be executed and the action triggered by the trigger request currently executed are mutually exclusive, after the trigger request currently executed is executed, call, according to the trigger request to be executed, the corresponding action execution interface to process the trigger event.

In a possible implementation, the trigger request carries an activation identifier, and the activation identifier is used to indicate whether the action triggered by the trigger request is an activation action.

The calling module 704 is specifically configured to:
determine whether the action triggered by the trigger request currently executed is the activation action according to the activation identifier in the trigger request currently executed; and
if the action triggered by the trigger request currently executed is the activation action, determine that the action triggered by the trigger request currently executed is within the action cycle.

In a possible implementation, the calling module 704 is specifically configured to:
obtain a type of the action triggered by the trigger request to be executed and a type of the action triggered by the trigger request currently executed;
determine whether the type of the action triggered by the trigger request to be executed is consistent with the type of the action triggered by the trigger request currently executed; and
if the type of the action triggered by the trigger request to be executed is consistent with the type of the action triggered by the trigger request currently executed, determine that the action triggered by the trigger request to be executed and the action triggered by the trigger request currently executed are not mutually exclusive.

In a possible implementation, after the trigger signal collision detection is performed, and before obtaining, according to the preset sequence, the trigger request from the preset action queue as the trigger request to be executed, the obtaining module 703 is further configured to:

call a corresponding hover processing interface to process a hover event according to a node where a trigger signal collides with the UI in a previous frame and which is detected through the trigger signal collision detection and according to a node where the trigger signal collides with the UI in a current frame and which is detected through the trigger signal collision detection, and display a processed result of the hover processing interface on the UI.

In a possible implementation, the hover processing interface includes a hover entry interface, a hover stop interface, and a hover end interface; and the obtaining module 703 is specifically configured to:
compare the node where the trigger signal collides with the UI in the previous frame and the node where the trigger signal collides with the UI in the current frame;
according to a node, in a comparison result, which is not among nodes where the trigger signal collides with the UI in the previous frame, but is among nodes where the trigger signal collides with the UI in the current frame, call the hover entry interface to process the hover event;
according to a node, in the comparison result, which is among the nodes where the trigger signal collides with the UI in the previous frame, and is among the nodes where the trigger signal collides with the UI in the current frame, call the hover stop interface to process the hover event; and
according to a node, in the comparison result, which is among the nodes where the trigger signal collides with the UI in the previous frame, and is not among the nodes where the trigger signal collides with the UI in the current frame, call the hover end interface to process the hover event.

In a possible implementation, the calling module 704 is specifically configured to:
obtain a type of an action triggered by the trigger request to be executed;
determine the corresponding action execution interface to be called according to the type of the action triggered by the trigger request to be executed; and
call the corresponding action execution interface to process the trigger event. In a possible implementation, the target execution component interacts with a management system.

The receiving module 701 is specifically configured to:
receive the trigger request sent by the management system, where the trigger request is received by the management system from the target input device, and the trigger request is used to instruct the management system to set the state of the target execution component to be active, and set the state of each of the remaining execution components in the plurality of execution components except the target execution component to be inactive.

The apparatus provided by the embodiment of the present disclosure can be used to perform the technical solutions of the method embodiments shown in FIG. 2 to FIG. 4, and implementation principles and technical effects thereof are similar, and the details are not described herein again in the embodiment of the present disclosure.

Figure 8:
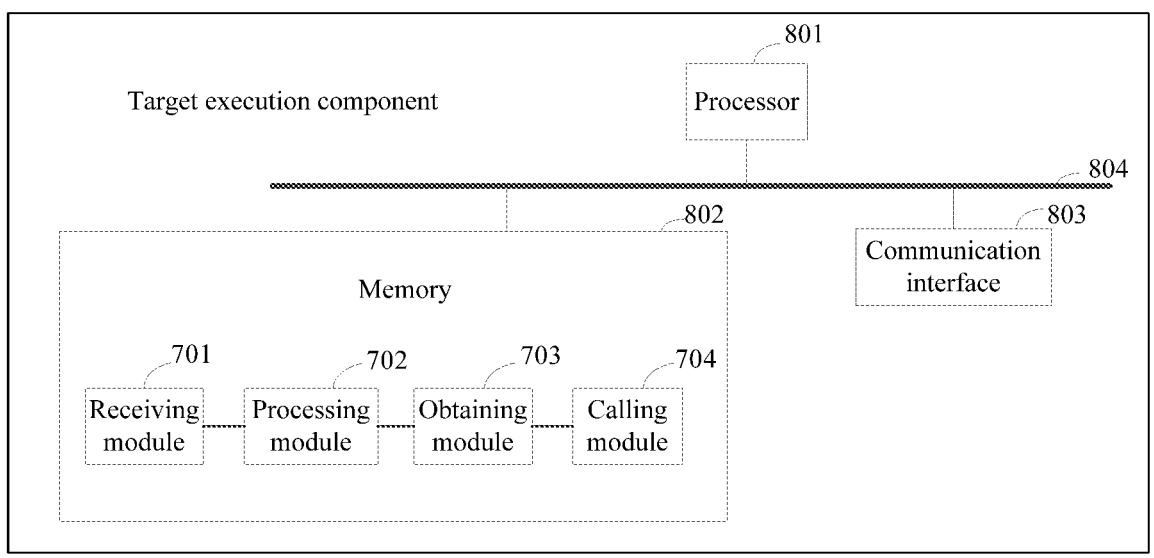
FIG. 8 is a schematic diagram of a basic hardware architecture of a target execution component provided by an embodiment of the present disclosure.

In a possible implementation, FIG. 8 schematically provides a schematic diagram of a possible basic hardware architecture of the target execution component described in the present disclosure.

Referring to FIG. 8, the target execution component includes at least one processor 801 and a communication interface 803. In a possible implementation, a memory 802 and a bus 804 may also be included.

In the target execution component, the number of a processor 801 may be one or more, and FIG. 8 only illustrates one of the processors 801. In a possible implementation, the processor 801 may be a central processing unit (central processing unit, CPU), a graphics processing unit (graphics processing unit, GPU), or a digital signal processor (digital signal processor, DSP). If the target execution component has multiple processors 801, the types of multiple processors 801 may be different or the same. In a possible implementation, the multiple processors 801 of the target execution component may also be integrated into a multi-core processor.

The memory 802 stores computer instructions and data. The memory 802 may store computer instructions and data required to implement the interaction method provided by the present disclosure. For example, the memory 802 stores instructions for implementing the steps of the interaction method. The memory 802 may be any one or any combination of the following storage media: a non-volatile memory (e.g., a read-only memory (Read-Only Memory, ROM), a solid state disk (Solid State Disk SSD), a hard disk (Hard Disk Drive, HDD), an optical disc) and a volatile memory.

The communication interface 803 may provide information input/output for the at least one processor. It may also include any one or any combination of the following devices: a network interface (such as an Ethernet interface), a wireless network card, and other devices with network access function.

In a possible implementation, the communication interface 803 may also be used for data communication between the target execution component and other computing devices or terminals.

In a possible implementation, FIG. 8 represents the bus 804 with a thick line. The bus 804 may connect the processor 801 with the memory 802 and the communication interface 803. In this way, through the bus 804, the processor 801 can access the memory 802, and can also use the communication interface 803 to perform data interaction with other computing devices or terminals.

In the present disclosure, the target execution component executes the computer instructions in the memory 802, so that the target execution component implements the interaction methods provided by the present disclosure, or deploys the interaction apparatus 70.

From the perspective of logical function division, for example, as shown in FIG. 8, the memory 802 may include a receiving module 701, a processing module 702, an obtaining module 703 and a calling module 704. The inclusion here only refers to that the functions of the receiving module, the processing module, the obtaining module and the calling module can be implemented respectively when the instructions stored in the memory are executed, and it is not limited to be a physical structure.

The present disclosure provides a computer-readable storage medium, where the computer-readable program product includes computer instructions, and the computer instructions instruct a computing device to execute the interaction methods provided by the present disclosure.

The present disclosure provides a computer program product including computer instructions, and the computer instructions are executed by a processor to execute the interaction methods.

The present disclosure provides a computer program, where the computer program is stored in a readable storage medium, at least one processor of an electronic device can read the computer program from the readable storage medium, and the at least one processor executes the computer program, so that the electronic device executes the method provided by any one of the embodiments.

The present disclosure provides a chip including at least one processor and a communication interface, and the communication interface provides information input and/or output for the at least one processor. Further, the chip may also include at least one memory for storing computer instructions. The at least one processor is configured to call and execute the computer instructions to implement the interaction methods provided by the present disclosure.

In the several embodiments provided by the present disclosure, it should be understood that the disclosed apparatuses and methods may be implemented in other manners. For example, the apparatus embodiments described above are only illustrative. For example, the division of the units is only a logical function division. In the actual implementations, there may be other division manners. For example, multiple units or components may be combined or integrated into another system, or some features can be ignored, or not implemented. On the other hand, mutual coupling, direct coupling or communication connection shown or discussed may be indirect coupling or communication connection of apparatuses or units through some interfaces, and may be in electrical, mechanical or other forms.

The units described as separate components may or may not be separated in physical, and components displayed as units may or may not be physical units, that is, may be located in one place, or may be distributed to multiple network units. Some or all of the units may be selected according to actual needs to achieve the purpose of the solution in the embodiments.

In addition, each functional unit in each embodiment of the present disclosure may be integrated into one processing unit, or each unit may exist alone in physical, or two or more units may be integrated into one unit. The integrated unit may be implemented in the form of hardware, or may be implemented in the form of hardware plus software functional units.

The invention claimed is:

1. An interaction method, applied to a target execution component, wherein the target execution component is one of a plurality of execution components, and one execution component corresponds to one input device, and the method comprises:
receiving a trigger request, wherein the trigger request is sent by a target input device, the target execution component corresponds to the target input device, a state of the target execution component is active, and a state of each remaining execution component in the plurality of execution components except the target execution component is inactive;
caching the trigger request in a preset action queue, and performing trigger signal collision detection based on a user interface after receiving an update instruction;
obtaining, according to a preset sequence, a trigger request from the preset action queue as a trigger request to be executed, after the trigger signal collision detection is performed; and
calling, according to the trigger request to be executed, an action execution interface to process a trigger event, and displaying a processed result of the action execution interface on the user interface.

2. The method according to claim 1, before calling, according to the trigger request to be executed, the action execution interface to process the trigger event, further comprising:
determining whether an action triggered by a trigger request currently executed is within an action cycle; and
the calling, according to the trigger request to be executed, the action execution interface to process the trigger event comprises:
if the action triggered by the trigger request currently executed is not within the action cycle, calling, according to the trigger request to be executed, the action execution interface to process the trigger event.

3. The method according to claim 2, after determining whether the action triggered by the trigger request currently executed is within the action cycle, further comprising:
if the action triggered by the trigger request currently executed is within the action cycle, determining whether an action triggered by the trigger request to be executed and the action triggered by the trigger request currently executed are mutually exclusive;
the calling, according to the trigger request to be executed, the action execution interface to process the trigger event comprises:
if the action triggered by the trigger request to be executed and the action triggered by the trigger request currently executed are not mutually exclusive, calling, according to the trigger request to be executed, the corresponding action execution interface to process the trigger event; and
if the action triggered by the trigger request to be executed and the action triggered by the trigger request currently executed are mutually exclusive, after the trigger request currently executed is executed, calling, according to the trigger request to be executed, the action execution interface to process the trigger event.

4. The method according to claim 2, wherein the trigger request carries an activation identifier, and the activation identifier is used to indicate whether the action triggered by the trigger request is an activation action; and
the determining whether the action triggered by the trigger request currently executed is within the action cycle comprises:
determining whether the action triggered by the trigger request currently executed is the activation action according to the activation identifier in the trigger request currently executed; and
if the action triggered by the trigger request currently executed is the activation action, determining that the action triggered by the trigger request currently executed is within the action cycle.

5. The method according to claim 3, wherein the trigger request carries an activation identifier, and the activation identifier is used to indicate whether the action triggered by the trigger request is an activation action; and
the determining whether the action triggered by the trigger request currently executed is within the action cycle comprises:

determining whether the action triggered by the trigger request currently executed is the activation action according to the activation identifier in the trigger request currently executed; and if the action triggered by the trigger request currently executed is the activation action, determining that the action triggered by the trigger request currently executed is within the action cycle.

6. The method according to claim 3, wherein the determining whether the action triggered by the trigger request to be executed and the action triggered by the trigger request currently executed are mutually exclusive comprises:

obtaining a type of the action triggered by the trigger request to be executed and a type of the action triggered by the trigger request currently executed;

determining whether the type of the action triggered by the trigger request to be executed is consistent with the type of the action triggered by the trigger request currently executed; and if the type of the action triggered by the trigger request to be executed is consistent with the type of the action triggered by the trigger request currently executed, determining that the action triggered by the trigger request to be executed and the action triggered by the trigger request currently executed are not mutually exclusive.

7. The method according to claim 1, after the trigger signal collision detection is performed, and before obtaining, according to the preset sequence, the trigger request from the preset action queue as the trigger request to be executed, further comprising:

calling a hover processing interface to process a hover event according to a node where a trigger signal collides with the user interface in a previous frame and which is detected through the trigger signal collision detection and according to a node where the trigger signal collides with the user interface in a current frame and which is detected through the trigger signal collision detection, and displaying a processed result of the hover processing interface on the user interface.

8. The method according to claim 7, wherein the hover processing interface comprises a hover entry interface, a hover stop interface, and a hover end interface;

the calling the hover processing interface to process the hover event according to the node where the trigger signal collides with the user interface in the previous frame and which is detected through the trigger signal collision detection and according to the node where the trigger signal collides with the user interface in the current frame and which is detected through the trigger signal collision detection comprises:

comparing the node where the trigger signal collides with the user interface in the previous frame and the node where the trigger signal collides with the user interface in the current frame;

according to a node, in a comparison result, which is not among nodes where the trigger signal collides with the user interface in the previous frame, but is among nodes where the trigger signal collides with the user interface in the current frame, calling the hover entry interface to process the hover event;

according to a node, in the comparison result, which is among the nodes where the trigger signal collides with the user interface in the previous frame, and is among the nodes where the trigger signal collides with the user interface in the current frame, calling the hover stop interface to process the hover event; and according to a node, in the comparison result, which is among the nodes where the trigger signal collides with the user interface in the previous frame, but is not among the nodes where the trigger signal collides with the user interface in the current frame, calling the hover end interface to process the hover event.

9. The method according to claim 1, wherein the calling, according to the trigger request to be executed, the action execution interface to process the trigger event comprises:

obtaining a type of an action triggered by the trigger request to be executed;

determining the action execution interface to be called according to the type of the action triggered by the trigger request to be executed; and calling the action execution interface to process the trigger event.

10. The method according to claim 1, wherein the target execution component interacts with a management system; and the receiving the trigger request comprises:

receiving the trigger request sent by the management system, wherein the trigger request is received by the management system from the target input device, and the trigger request is used to instruct the management system to set the state of the target execution component to be active, and set the state of each of the remaining execution components in the plurality of execution components except the target execution component to be inactive.

11. An interaction apparatus, applied to a target execution component, wherein the target execution component is one of a plurality of execution components, and one execution component corresponds to one input device, and the apparatus comprises:

at least one processor;

a communication interface connected with the at least one processor, and a memory storing instructions and connected with the at least one processor;

wherein the instructions, when executed by the at least one processor, cause the at least one processor to:

receive, through the communication interface, a trigger request, wherein the trigger request is sent by a target input device, the target execution component corresponds to the target input device, a state of the target execution component is active, and a state of each remaining execution component in the plurality of execution components except the target execution component is inactive;

cache the trigger request in a preset action queue, and perform trigger signal collision detection based on a user interface after receiving, through the communication interface, an update instruction;

obtain, according to a preset sequence, a trigger request from the preset action queue as a trigger request to be executed, after the trigger signal collision detection is performed; and call, according to the trigger request to be executed, an action execution interface to process a trigger event, and display a processed result of the action execution interface on the user interface.

12. The apparatus according to claim 11, wherein the instructions further cause the at least one processor to:

determine whether an action triggered by a trigger request currently executed is within an action cycle; and if the action triggered by the trigger request currently executed is not within the action cycle, call, according to the trigger request to be executed, the execution interface to process the trigger event.

13. The apparatus according to claim 12, wherein the instructions further cause the at least one processor to:
    if the action triggered by the trigger request currently executed is within the action cycle, determine whether an action triggered by the trigger request to be executed and the action triggered by the trigger request currently executed are mutually exclusive;
    if the action triggered by the trigger request to be executed and the action triggered by the trigger request currently executed are not mutually exclusive, call, according to the trigger request to be executed, the corresponding action execution interface to process the trigger event; and
    if the action triggered by the trigger request to be executed and the action triggered by the trigger request currently executed are mutually exclusive, after the trigger request currently executed is executed, call, according to the trigger request to be executed, the action execution interface to process the trigger event.

14. The apparatus according to claim 12, wherein the trigger request carries an activation identifier, and the activation identifier is used to indicate whether the action triggered by the trigger request is an activation action; and
    the instructions further cause the at least one processor to:
    determine whether the action triggered by the trigger request currently executed is the activation action according to the activation identifier in the trigger request currently executed; and
    if the action triggered by the trigger request currently executed is the activation action, determine that the action triggered by the trigger request currently executed is within the action cycle.

15. The apparatus according to claim 13, wherein the instructions further cause the at least one processor to:
    obtain a type of the action triggered by the trigger request to be executed and a type of the action triggered by the trigger request currently executed;
    determine whether the type of the action triggered by the trigger request to be executed is consistent with the type of the action triggered by the trigger request currently executed; and
    if the type of the action triggered by the trigger request to be executed is consistent with the type of the action triggered by the trigger request currently executed, determine that the action triggered by the trigger request to be executed and the action triggered by the trigger request currently executed are not mutually exclusive.

16. The apparatus according to claim 11, wherein the instructions further cause the at least one processor to:
    call a hover processing interface to process a hover event according to a node where a trigger signal collides with the user interface in a previous frame and which is detected through the trigger signal collision detection and according to a node where the trigger signal collides with the user interface in a current frame and which is detected through the trigger signal collision detection, and display a processed result of the hover processing interface on the user interface.

17. The apparatus according to claim 16, wherein the hover processing interface comprises a hover entry interface, a hover stop interface, and a hover end interface; and
    the instructions further cause the at least one processor to:
    compare the node where the trigger signal collides with the user interface in the previous frame and the node where the trigger signal collides with the user interface in the current frame;
    according to a node, in a comparison result, which is not among nodes where the trigger signal collides with the user interface in the previous frame, but is among nodes where the trigger signal collides with the user interface in the current frame, call the hover entry interface to process the hover event;
    according to a node, in the comparison result, which is among the nodes where the trigger signal collides with the user interface in the previous frame, and is among the nodes where the trigger signal collides with the user interface in the current frame, call the hover stop interface to process the hover event; and
    according to a node, in the comparison result, which is among the nodes where the trigger signal collides with the user interface in the previous frame, but is not among the nodes where the trigger signal collides with the user interface in the current frame, call the hover end interface to process the hover event.

18. The apparatus according to claim 11, wherein the instructions further cause the at least one processor to:
    obtain a type of an action triggered by the trigger request to be executed;
    determine the action execution interface to be called according to the type of the action triggered by the trigger request to be executed; and
    call the action execution interface to process the trigger event.

19. The apparatus according to claim 11, wherein the target execution component interacts with a management system; and
    the instructions further cause the at least one processor to:
    receive, through the communication interface, the trigger request sent by the management system, wherein the trigger request is received by the management system from the target input device, and the trigger request is used to instruct the management system to set the state of the target execution component to be active, and set the state of each of the remaining execution components in the plurality of execution components except the target execution component to be inactive.

20. A non-transitory computer-readable storage medium, wherein the computer-readable storage medium stores a computer program, and the computer program causes a server to perform the followings:
    receiving a trigger request, wherein the trigger request is sent by a target input device, a target execution component corresponds to the target input device, a state of the target execution component is active, and a state of each remaining execution component in the plurality of execution components except the target execution component is inactive;
    caching the trigger request in a preset action queue, and performing trigger signal collision detection based on a user interface after receiving an update instruction;
    obtaining, according to a preset sequence, a trigger request from the preset action queue as a trigger request to be executed, after the trigger signal collision detection is performed; and
    calling, according to the trigger request to be executed, an action execution interface to process a trigger event, and displaying a processed result of the action execution interface on the user interface.

* * * * *